US012392148B1

(12) United States Patent
Kuntz

(10) Patent No.: US 12,392,148 B1
(45) Date of Patent: Aug. 19, 2025

(54) MORTAR-DISPENSING DEVICE

(71) Applicant: Charles Kuntz, Waterloo (CA)

(72) Inventor: Charles Kuntz, Waterloo (CA)

( * ) Notice: Subject to any disclaimer, the term of this patent is extended or adjusted under 35 U.S.C. 154(b) by 238 days.

(21) Appl. No.: 18/200,647

(22) Filed: May 23, 2023

(51) Int. Cl.
*E04G 21/20* (2006.01)
*B05C 17/005* (2006.01)
*B05C 17/01* (2006.01)
*E04F 21/22* (2006.01)

(52) U.S. Cl.
CPC ...... *E04G 21/204* (2013.01); *B05C 17/00516* (2013.01); *B05C 17/00589* (2013.01); *B05C 17/0103* (2013.01); *E04F 21/22* (2013.01); *E04G 21/20* (2013.01); *E04G 21/201* (2013.01); *E04G 21/202* (2013.01); *E04G 21/205* (2013.01); *E04G 21/206* (2013.01)

(58) Field of Classification Search
CPC ..... E04G 21/20; E04G 21/201; E04G 21/202; E04G 21/204; E04G 21/205; E04G 21/206
See application file for complete search history.

(56) References Cited

U.S. PATENT DOCUMENTS 1,142,022 A * 6/1915 Chappell ............. E04F 21/1652 401/265
1,641,703 A * 9/1927 Stanton ................... E04G 21/04 404/110
2,104,086 A * 1/1938 Lines .................. E04F 21/1652 401/265
2,610,768 A * 9/1952 Le Clair ................... F16N 5/02 222/262
2,692,641 A * 10/1954 Woods .................... E01C 19/44 126/401
2,694,509 A * 11/1954 Vita ........................ E04F 21/08 222/413
2,847,689 A * 8/1958 Miller ..................... E04D 15/07 15/147.1
3,363,524 A * 1/1968 Catenacci ........... E01C 19/4893 404/84.2
3,389,838 A * 6/1968 Morra ..................... B05C 17/01 222/326
3,396,218 A * 8/1968 Despota .................. E04F 21/08 48/197 R
3,768,939 A * 10/1973 Gramling .............. E04F 21/165 401/265
3,804,696 A * 4/1974 Lobmeier ............... E01C 19/16 156/499
3,826,410 A 7/1974 Meyer
3,868,046 A * 2/1975 Maddalena ............. B29C 48/02 222/146.5

(Continued)

FOREIGN PATENT DOCUMENTS

JP 10057865 A * 3/1998

*Primary Examiner* — Timothy Kennedy
(74) *Attorney, Agent, or Firm* — Kyle A. Fletcher, Esq.

(57) ABSTRACT

The mortar-dispensing device includes a hopper, a trowel, an extruder, a battery, and an operator control. The mortar-dispensing device may be a tool for applying mortar to a substrate in preparation for laying tile. The hopper may be configured to hold the mortar prior to application of the mortar to the substrate. The trowel may rake the mortar to create a bed of mortar comprising mortar ridges. The extruder may force the mortar out of the hopper through the bottom of the hopper. The extruder may be energized by the battery under control of the operator control.

17 Claims, 5 Drawing Sheets

(56) References Cited

U.S. PATENT DOCUMENTS

| | | | | | |
|---|---|---|---|---|---|
| 3,877,830 | A * | 4/1975 | James, III | E01C 19/4873 | 404/110 |
| 3,985,273 | A * | 10/1976 | Davis, Jr. | B05C 17/0103 | 222/326 |
| 4,231,668 | A * | 11/1980 | Groth | B05C 17/0333 | 401/206 |
| 4,322,022 | A * | 3/1982 | Bergman | B05C 17/0103 | 74/424.78 |
| 4,352,445 | A * | 10/1982 | Cusumano | E04G 21/204 | 52/749.13 |
| 5,054,658 | A | 10/1991 | Aronie | | |
| 5,226,575 | A | 7/1993 | Faust | | |
| 5,244,123 | A * | 9/1993 | Benedict | E04F 21/08 | 401/265 |
| 5,254,167 | A * | 10/1993 | Janoski | B05C 5/0275 | 118/305 |
| 5,385,274 | A * | 1/1995 | Twyman | B05C 17/01 | 106/713 |
| 5,387,051 | A | 2/1995 | Valente | | |
| 5,603,435 | A * | 2/1997 | Fenwick | B05C 17/00569 | 198/662 |
| 5,695,788 | A * | 12/1997 | Woods | E04F 21/08 | 15/245.1 |
| 5,878,921 | A * | 3/1999 | Chase | E04F 21/08 | 222/626 |
| 5,947,346 | A * | 9/1999 | London | E04D 15/07 | 401/48 |
| 6,012,614 | A * | 1/2000 | Stanford | B28C 5/123 | 222/391 |
| 6,050,744 | A * | 4/2000 | Binning | E01C 19/185 | 404/110 |
| 6,450,723 | B1 * | 9/2002 | Lithgow | E04F 21/08 | 401/266 |
| 6,645,329 | B1 | 11/2003 | Rafoss | | |
| 7,138,015 | B2 | 11/2006 | Rytter | | |
| D820,886 | S | 6/2018 | Ewringmann | | |
| 10,597,831 | B2 | 3/2020 | Menard | | |
| 2009/0293414 | A1 * | 12/2009 | Keohan | E04F 21/1652 | 52/742.16 |
| 2009/0294489 | A1 * | 12/2009 | Keohan | E04F 21/1652 | 401/137 |
| 2010/0050567 | A1 * | 3/2010 | Vandewinckel | E04G 21/025 | 52/749.13 |
| 2010/0236007 | A1 * | 9/2010 | Lawes | E04G 21/20 | 15/235.3 |
| 2012/0114850 | A1 * | 5/2012 | Ferguson | E04B 2/54 | 118/100 |
| 2012/0257927 | A1 * | 10/2012 | Schmidt | E01C 23/0973 | 404/110 |
| 2012/0328792 | A1 * | 12/2012 | Campbell | E04G 21/204 | 401/5 |
| 2014/0050513 | A1 * | 2/2014 | Wilcox | E04G 21/20 | 401/137 |
| 2017/0101792 | A1 * | 4/2017 | Campbell | E04G 21/0418 | |
| 2020/0030491 | A1 * | 1/2020 | Weisman | B33Y 80/00 | |
| 2022/0316931 | A1 * | 10/2022 | Joseph | E04G 21/04 | |
| 2023/0256649 | A1 * | 8/2023 | McGee | B33Y 30/00 | 425/149 |

* cited by examiner

MORTAR-DISPENSING DEVICE

CROSS REFERENCES TO RELATED APPLICATIONS

Not Applicable

STATEMENT REGARDING FEDERALLY SPONSORED RESEARCH

Not Applicable REFERENCE TO APPENDIX Not Applicable

BACKGROUND OF THE INVENTION

Field of the Invention

The present invention relates to the field of masonry tools, more specifically, a mortar-dispensing device.

SUMMARY OF INVENTION

The mortar-dispensing device comprises a hopper, a trowel, an extruder, a battery, and an operator control. The mortar-dispensing device may be a tool for applying mortar to a substrate in preparation for laying tile. The hopper may be configured to hold the mortar prior to application of the mortar to the substrate. The trowel may rake the mortar to create a bed of mortar comprising mortar ridges. The extruder may force the mortar out of the hopper through the bottom of the hopper. The extruder may be energized by the battery under control of the operator control.

An object of the invention is to extrude mortar from a hopper onto a substrate.

Another object of the invention is to provide an actuator and a pusher plate to extrude the mortar.

A further object of the invention is to provide a trowel to rake the mortar as the invention is moved over the mortar.

Yet another object of the invention is to provide a battery and an operator control to energize and de-energize the actuator.

These together with additional objects, features and advantages of the mortar-dispensing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the mortar-dispensing device in detail, it is to be understood that the mortar-dispensing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mortar-dispensing device.

It is therefore important that the claims be regarded as including such equivalent construction insofar as they do not depart from the spirit and scope of the mortar-dispensing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
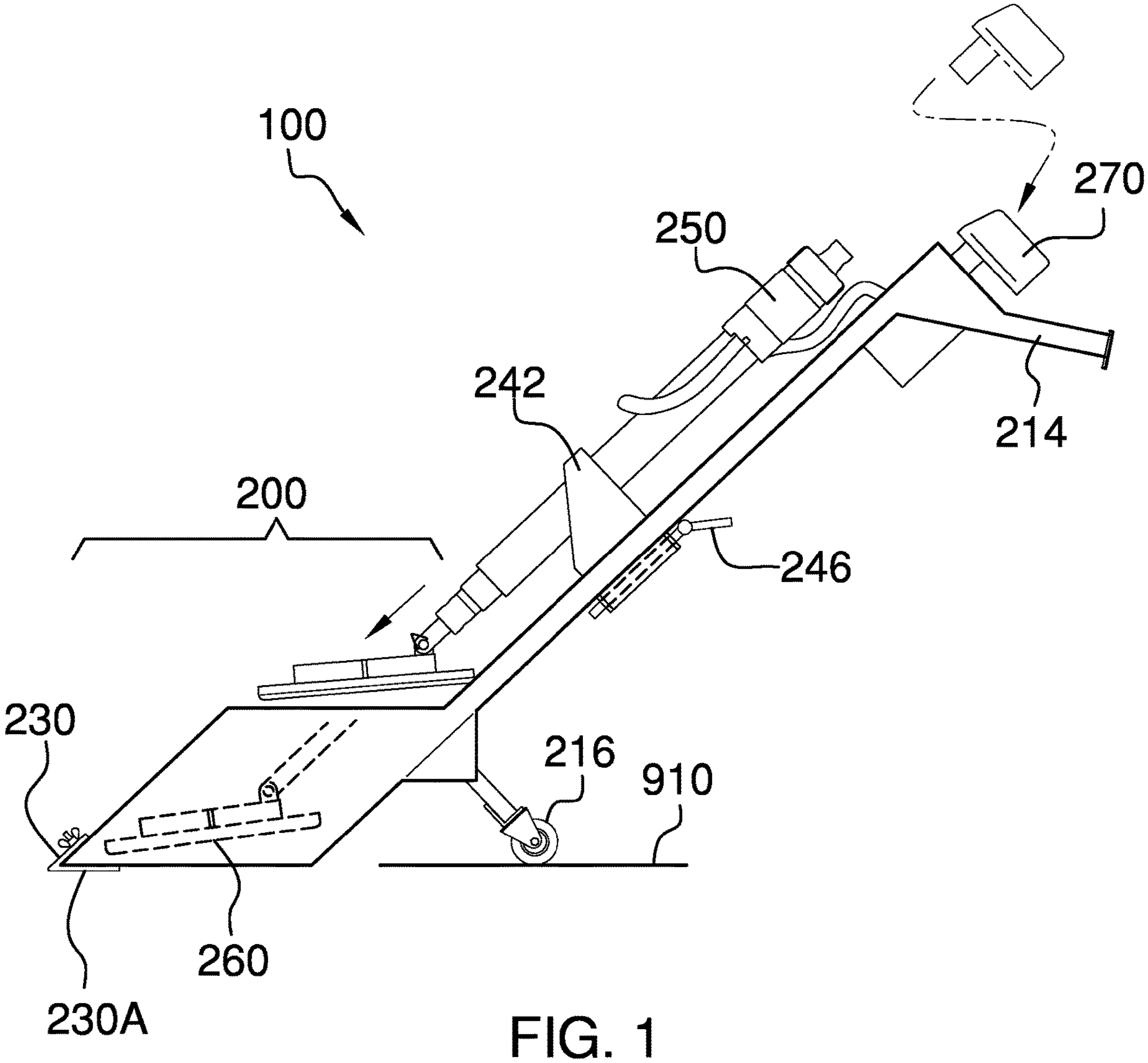
FIG. 1 is a side view of an embodiment of the disclosure.
Figure 2:
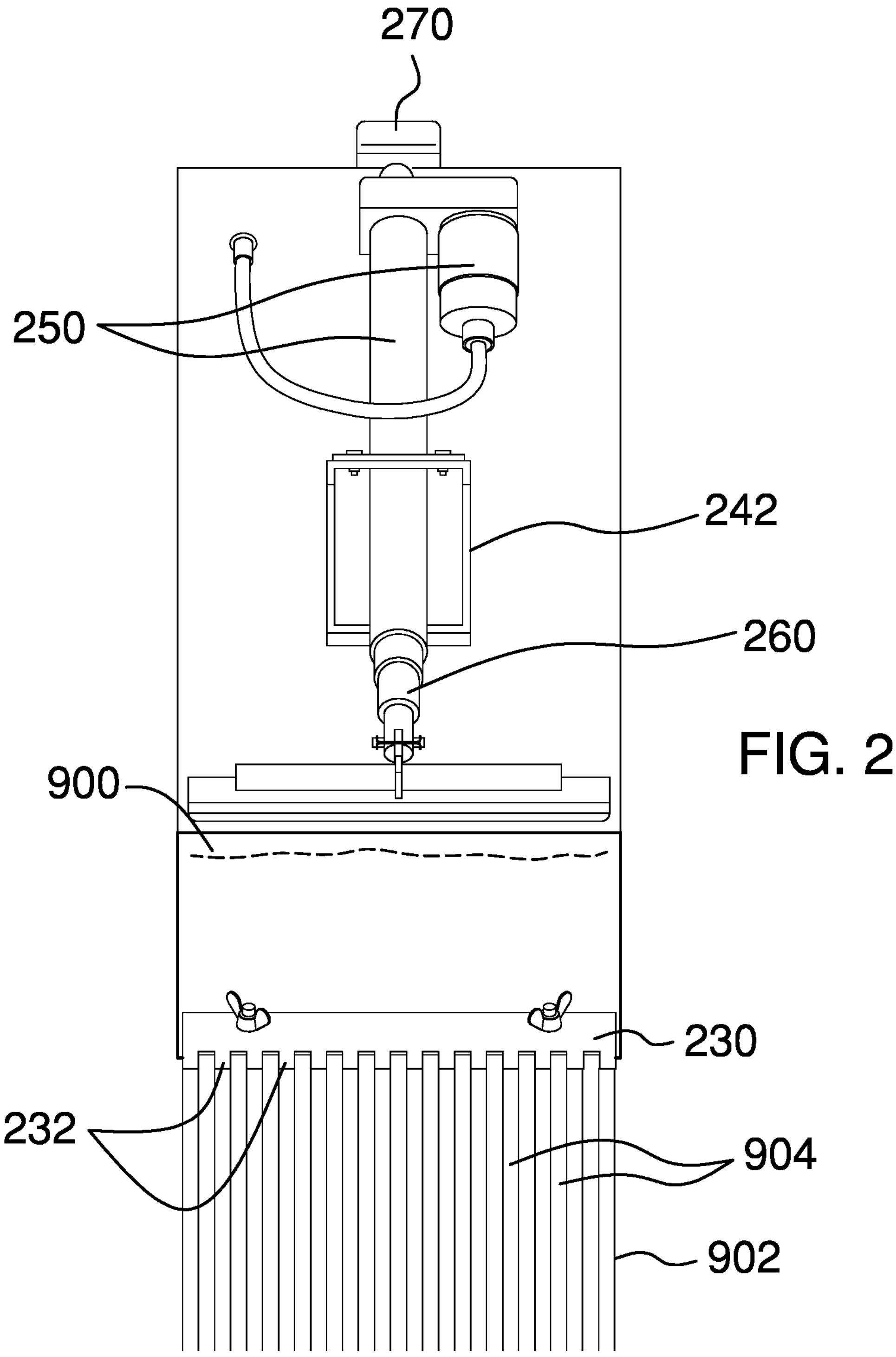
FIG. 2 is a front view of an embodiment of the Disclosure.
Figure 3:
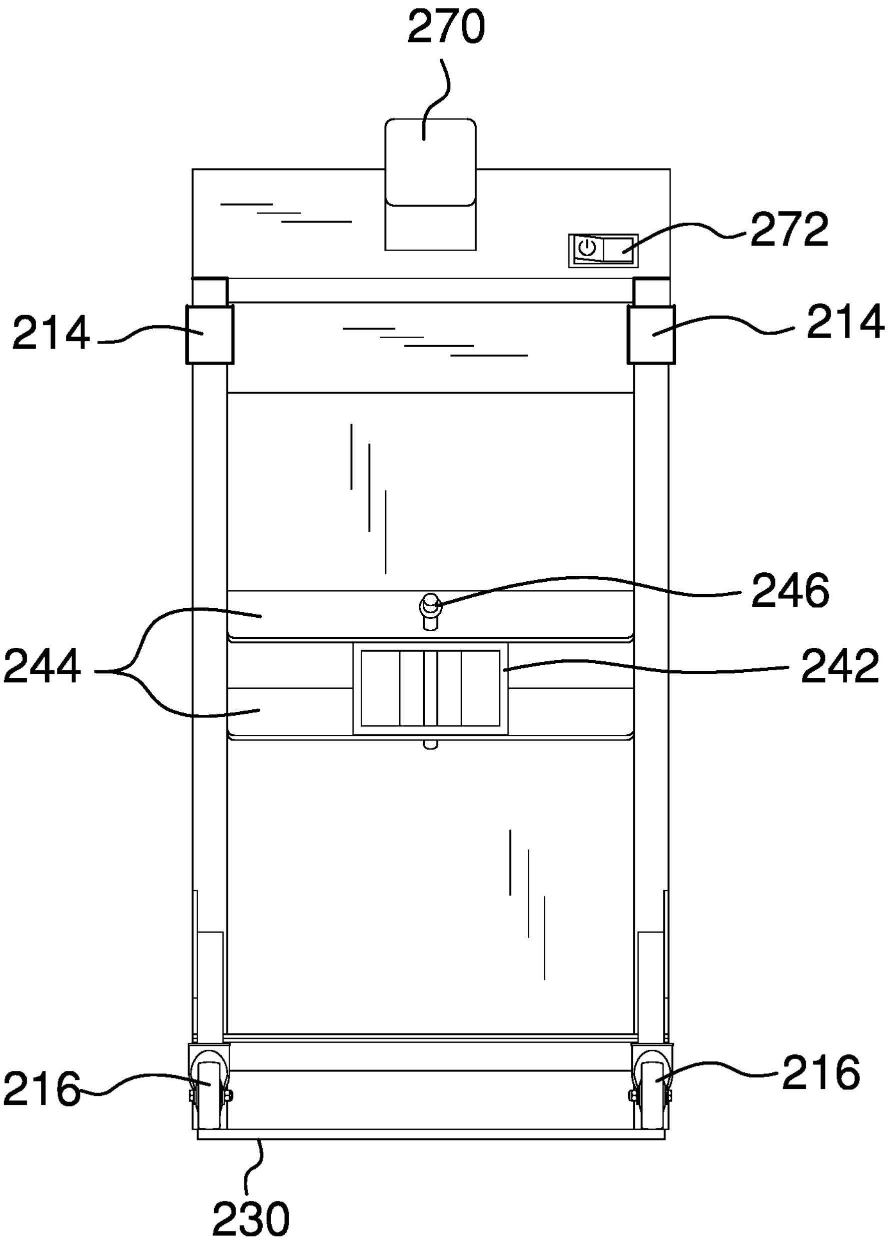
FIG. 3 is a rear view of an embodiment of the disclosure.
Figure 4:
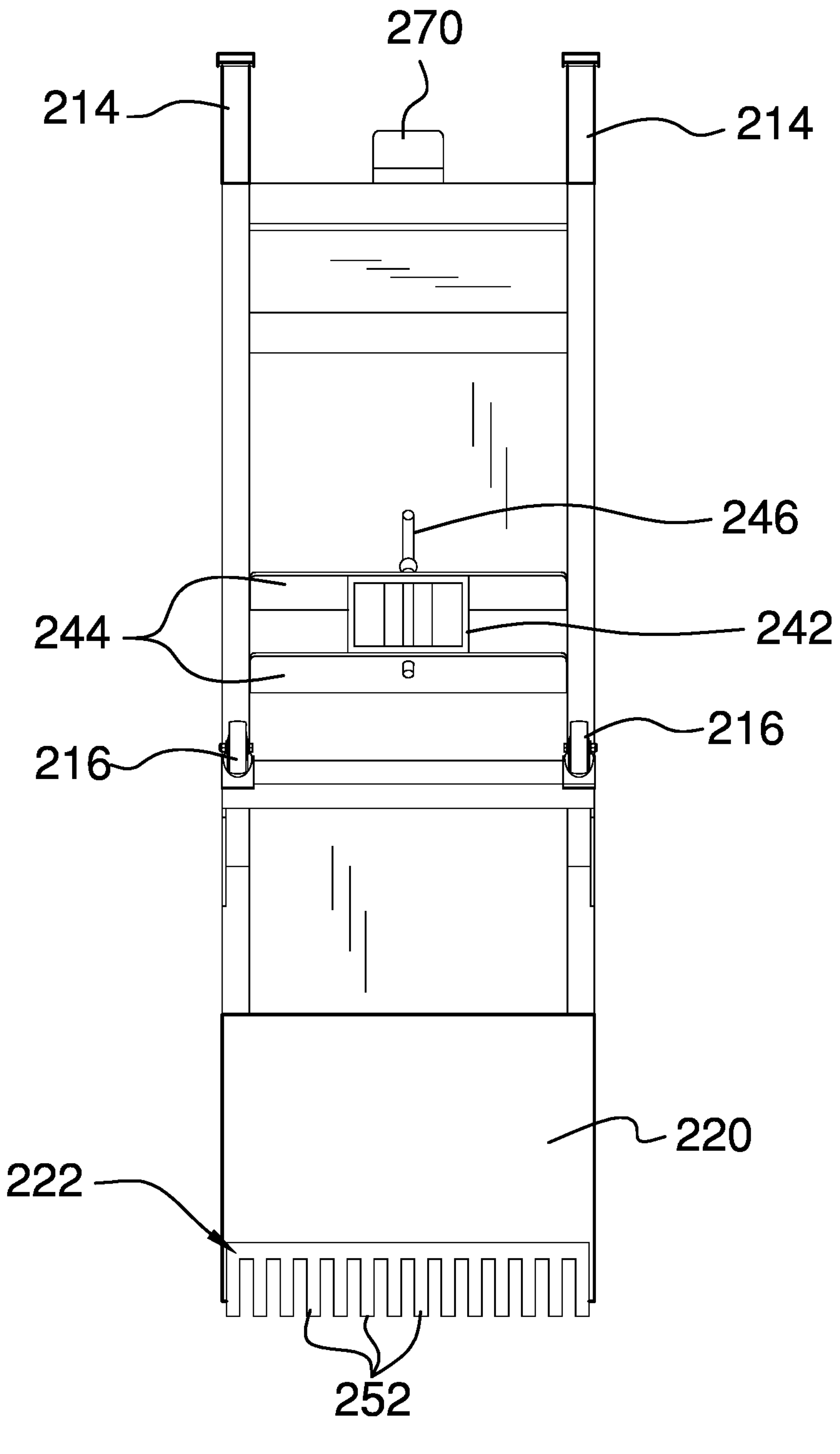
FIG. 4 is a bottom view of an embodiment of the disclosure.
Figure 5:
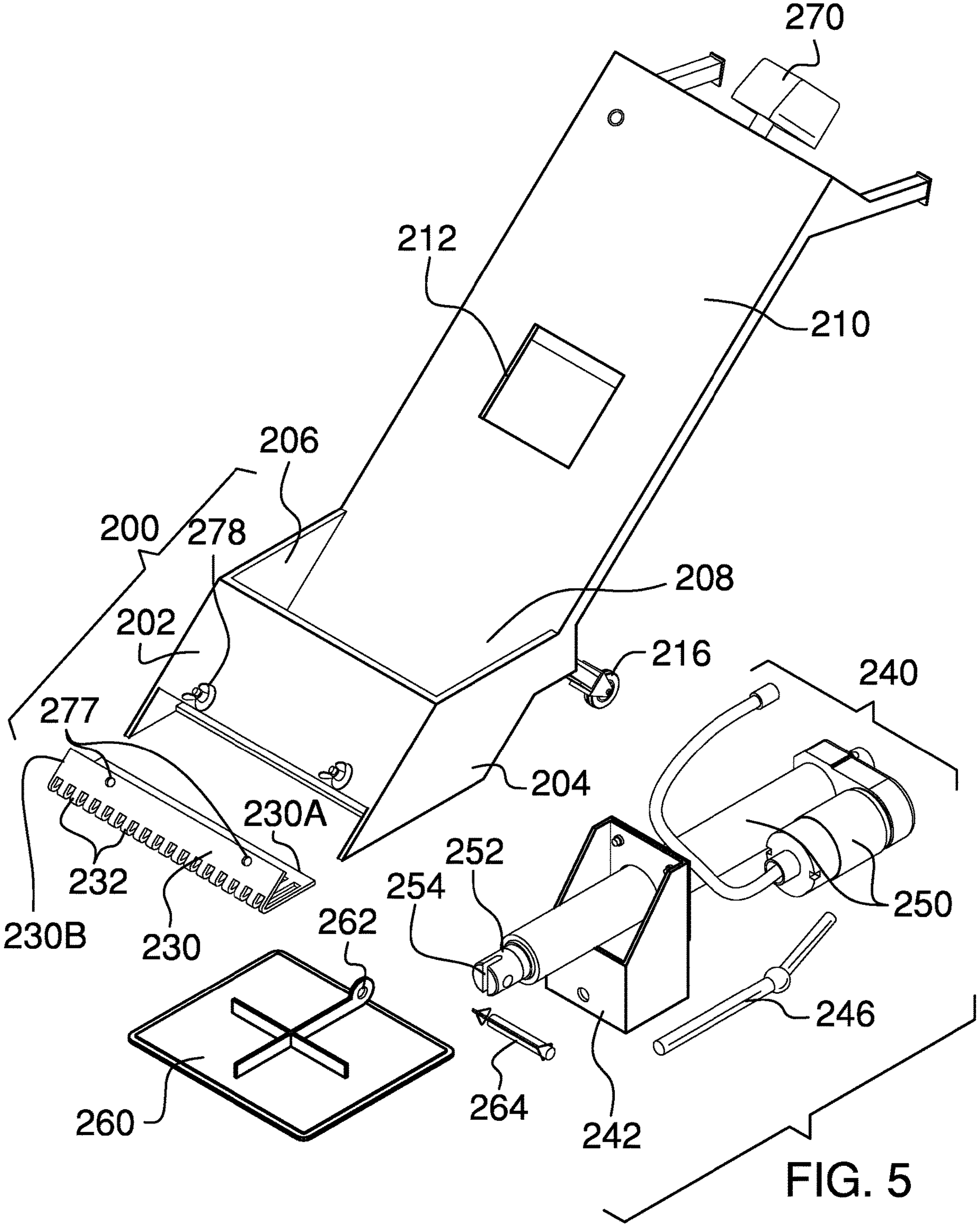
FIG. 5 is an exploded view of an embodiment of the disclosure.

Detailed reference will now be made to a first potential embodiment of the disclosure, which is illustrated in FIGS. 1 through 5.

The mortar-dispensing device 100 (hereinafter invention) comprises a hopper 200, a trowel 230, an extruder 240, a battery 270, and an operator control 272. The invention 100 may be a tool for applying mortar 900 to a substrate 910 in preparation for laying tile. The hopper 200 may be configured to hold the mortar 900 prior to application of the mortar 900 to the substrate 910. The trowel 230 may rake the mortar 900 to create a bed of mortar 902 comprising mortar ridges 904. The extruder 240 may force the mortar 900 out of the hopper 200 through the bottom of the hopper 200. The extruder 240 may be energized by the battery 270 under control of the operator control 272.

The hopper 200 may be an open-top container for holding the mortar 900 prior to extruding onto the substrate 910. The hopper may comprise a front wall 202, a left wall 204, a right wall 206, a rear wall 208, and a bottom wall 220. In some embodiments, the profile of the hopper 200 as seen from a side may be a rhomboid such that the hopper 200 may guide the movement of a pusher plate 260.

The rear wall 208 may be coupled to a back board 210 which may extend upward and rearward from the rear of the hopper 200. The back board 210 may comprise a mounting aperture 212 for mounting the extruder 240. The top of the back board 210 may comprise a pair of handles 214 adapted for a user to grip while operating the invention 100. The hopper 200 may comprise a pair of wheels 216 to support the rear of the hopper 200 and to aid in maneuvering the invention 100. The hopper 200 may be elevated above the substrate 910 by the pair of wheels 216 in the rear and the trowel 230 in the front.

The mortar 900 may be extruded onto the substrate 910 through the bottom of the hopper 200. The bottom wall 220 of the hopper 200 may spread the mortar 900 evenly as the invention 100 is pulled backwards-towards the user. The trowel 230 may be coupled to the bottom of the front wall 202 of the hopper 200 and may extend downward below the level of the bottom wall 220 of the hopper 200. The trowel 230 may comprise a plurality of teeth 232 separated by a plurality of gaps. The mortar 900 May squeeze through the plurality of gaps to create the mortar ridges 904 as the mortar 900 emerges from under the front of the hopper 200. In some embodiments, the trowel 230 may be detachable and replaceable such that a different trowel May create ridges of a different shape, size, spacing, or any combination thereof.

It shall be noted that the trowel 230 has a bend in the design such that a first portion 230A of the trowel 230 interfaces with the substrate 910 directly. A second portion 230B of the trowel 230 includes holes 277 to enable fasteners 278 to secure the trowel 230 to the front wall 202.

The extruder 240 may comprise an actuator 250 and the pusher plate 260. The actuator 250 may be coupled to the back board 210. Energizing the actuator 250 may move the pusher plate 260 up or down. The pusher plate 260 may be positioned in the hopper 200 such that moving the pusher plate 260 down may press the top of the mortar 900 and force the mortar 900 through the trowel 230.

The actuator 250 may be an electric linear actuator. The actuator 250 may comprise a telescoping armature 252 that may be extended and retracted by energizing the actuator 250 with an electric potential. As non-limiting examples, the electric potential may have a first polarity to extend the telescoping armature 252 and the electric potential may have a second polarity that is opposite the first polarity to retract the telescoping armature 252. Removing the electric potential stop the telescoping armature 252 from moving. The actuator 250 may be oriented such that the telescoping armature 252 is located below the actuator 250.

The bottom of the telescoping armature 252 may comprise an actuator coupler 254 for coupling the telescoping armature 252 to a plate coupler 262 on the pusher plate 260. A pusher pin 264 may detachably couple the plate coupler 262 to the actuator coupler 254.

The actuator 250 may be coupled to a mounting frame 242. The mounting frame 242 may detachably couple to the back board by passing through the mounting aperture 212 in the back board 210. The mounting frame 242 may be secured to mounting brackets 244 located on the rear of the back board 210 by a mounting pin 246. The mounting brackets 244 may be coupled to the back board 210 in a lateral orientation and the mounting pin 246 may pass longitudinally through the mounting brackets 244 and the mounting frame 242.

The pusher plate 260 may be a rigid plate that may be detachably coupled to the lower end of the telescoping armature 252. The pusher plate 260 may press down against the mortar 900 as the telescoping armature 252 extends. The pusher plate 260 may be lifted from the hopper 200 as the telescoping armature retracts.

The battery 270 may comprise one or more energy-storage devices. The battery 270 may be a source of electrical energy to operate the actuator 250. The battery 270 may be rechargeable and replaceable. In some embodiments, the battery 270 may be accessible for replacement at the top of the back board 210.

The operator control 272 may control the energization of the actuator 250. The operator control 272 may apply the electric potential having the first polarity to extend the telescoping armature 252, may apply the electric potential having the second polarity to retract the telescoping armature 252, and may remove the electric potential to hold the telescoping armature 252 motionless. As non-limiting examples, the operator control 272 may be one or more rocker switches, toggle switches, rotary switches, pushbutton switches, key switches, or drum switches. In some embodiments, the operator control 272 may be a variable control such that the speed of extending and/or retracting may be adjustable.

In use, the pusher plate 260 may be withdrawn from the hopper 200 by using the operator control 272 to apply the electric potential having the second polarity to the actuator 250 and mortar 900 may be placed into the hopper 200. The pusher plate 260 may be lowered into the hopper 200 by using the operator control 272 to apply the electric potential having the first polarity to the actuator 250 until the pusher plate 260 reaches the top of the mortar 900 and the actuator 250 may be de-energized. The invention 100 may be positioned on one side of the substrate 910 and the actuator 250 may be energized again. The invention 100 may be pulled rearwards as the extruder 240 forces the mortar 900 out through the trowel 230. The bottom wall 220 of the hopper 200 may spread the mortar 900 into a thin, even coat under the hopper 200. As the front of the hopper 200 passes over the mortar 900, the plurality of teeth 232 on the trowel 230 may rake the mortar 900 to produce mortar ridges 904.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface or object. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used herein, "energize" and/or "energization" may refer to the application of an electrical potential to a system or subsystem. "De-energize" and/or "de-energization" may refer to the removal of the electrical potential.

As used in this disclosure, the word "lateral" may refer to the sides of an object or movement towards a side. Lateral directions are generally perpendicular to longitudinal directions. "Laterally" may refer to movement in a lateral direction.

As used herein, a "linear actuator" may be a device that produces linear motion. The device may be electromechanical, hydraulic, or pneumatic in nature. Upon activation by an electrical potential or by a change in fluid or air pressure, the overall length of the device may change-either by lengthening or shortening. In use, a first component of the linear actuator, which may be referred to as a motor or body, is fixed mounted to a first object and a second component of the linear actuator, which may be referred to as an actuator arm or lead screw, is fixed mounted to a second object. Activation of the device may cause the second component to linearly move relative to the first component thus changing the distance between the first object and the second object.

As used herein, the word "longitudinal" or "longitudinally" may refer to a lengthwise or longest direction or to a direction that is perpendicular to the lateral direction.

As used in this disclosure, "orientation" may refer to the positioning and/or angular alignment of a first object relative to a second object or relative to a reference position or reference direction.

As used herein, "rhomboid" may refer to the geometric shape which is a parallelogram with adjacent sides of unequal length and no right angles.

As used herein, "rigid" may refer to an object or material which is inflexible.

As used in this disclosure, "telescopic", "telescoping", and "telescopically" may refer to an object made of two or more sections that fit or slide into each other such that the object can be made longer or shorter by adjusting the relative positions of the sections.

As used herein, "trowel" may refer to a tool for applying and/or spreading mortar or plaster.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mortar-dispensing device comprising:

a hopper, a trowel, an extruder, a battery, and an operator control;

wherein the mortar-dispensing device is a tool for applying mortar to a substrate in preparation for laying tile;

wherein the hopper is configured to hold the mortar prior to application of the mortar to the substrate;

wherein the trowel rakes the mortar to create a bed of mortar comprising mortar ridges;

wherein the extruder forces the mortar out of the hopper through the bottom of the hopper;

wherein the extruder is energized via an electrical potential of by the battery under control of the operator control;

wherein the hopper is a container for holding the mortar prior to extruding onto the substrate;

wherein the hopper comprises a front wall, a left wall, a right wall, a rear wall, and a bottom wall;

wherein the mortar is placed into the hopper through an open top and is pushed out of the hopper via the trowel located in the bottom wall;

wherein the rear wall is coupled to a back board which extends upward and rearward from the rear of the hopper;

wherein the back board comprises a mounting aperture for mounting the extruder;

wherein the top of the back board comprises a pair of handles adapted for a user to grip while operating the mortar-dispensing device;

wherein the hopper comprises a pair of wheels to support the rear of the hopper and to aid in maneuvering the mortar-dispensing device;

wherein the hopper is elevated above the substrate by the pair of wheels in the rear and the trowel in the front.

2. The mortar-dispensing device according to claim 1 wherein the profile of the hopper as seen from a side is a rhomboid such that the hopper guides the movement of a pusher plate.

3. The mortar-dispensing device according to claim 2 wherein the mortar is extruded onto the substrate through the trowel on the bottom of the hopper;

wherein the bottom wall of the hopper spreads the mortar evenly as the mortar-dispensing device is pulled backwards.

4. The mortar-dispensing device according to claim 3 wherein the trowel is coupled to the bottom of the front wall of the hopper and extends downward below the level of the bottom wall of the hopper;

wherein the trowel comprises a plurality of teeth separated by a plurality of gaps;

wherein the mortar squeezes through the plurality of gaps to create the mortar ridges as the mortar emerges from under the front of the hopper.

5. The mortar-dispensing device according to claim 4 wherein the trowel has a bend in the design such that a first portion of the trowel interfaces with the substrate directly;

wherein a second portion of the trowel includes holes to enable fasteners to secure the trowel to the front wall.

6. The mortar-dispensing device according to claim 4 wherein the extruder comprises an actuator and the pusher plate;

wherein the actuator is coupled to the back board;

wherein energizing the actuator moves the pusher plate up or down;

wherein the pusher plate is positioned in the hopper such that moving the pusher plate down presses the top of the mortar and forces the mortar through the trowel.

7. The mortar-dispensing device according to claim 6
wherein the actuator is an electric linear actuator;
wherein the actuator comprises a telescoping armature that is extended and retracted by energizing the actuator with the electric potential of the battery.

8. The mortar-dispensing device according to claim 7
wherein the electric potential has a first polarity to extend the telescoping armature and the electric potential has a second polarity that is opposite the first polarity to retract the telescoping armature;
wherein removing the electric potential stops the telescoping armature from moving.

9. The mortar-dispensing device according to claim 8 wherein the actuator is oriented such that the telescoping armature is located below the actuator.

10. The mortar-dispensing device according to claim 9
wherein the bottom of the telescoping armature comprises an actuator coupler for coupling the telescoping armature to a plate coupler on the pusher plate;
wherein a pusher pin detachably couples the plate coupler to the actuator coupler.

11. The mortar-dispensing device according to claim 10
wherein the actuator is coupled to a mounting frame;
wherein the mounting frame detachably couples to the back board by passing through the mounting aperture in the back board;
wherein the mounting frame is secured to mounting brackets located on the rear of the back board by a mounting pin;
wherein the mounting brackets are coupled to the back board in a lateral orientation and the mounting pin passes longitudinally through the mounting brackets and the mounting frame.

12. The mortar-dispensing device according to claim 11
wherein the pusher plate is a rigid plate that is detachably coupled to the lower end of the telescoping armature;
wherein the pusher plate presses down against the mortar as the telescoping armature extends;
wherein the pusher plate is lifted from the hopper as the telescoping armature retracts.

13. The mortar-dispensing device according to claim 12
wherein the battery comprises one or more energy-storage devices;
wherein the battery is a source of electrical energy to operate the actuator;
wherein the battery is rechargeable and replaceable.

14. The mortar-dispensing device according to claim 13 wherein the battery is accessible for replacement at the top of the back board.

15. The mortar-dispensing device according to claim 13
wherein the operator control controls the energization of the actuator;
wherein the operator control applies the electric potential having the first polarity to extend the telescoping armature, applies the electric potential having the second polarity to retract the telescoping armature, and removes the electric potential to hold the telescoping armature motionless.

16. The mortar-dispensing device according to claim 15 wherein the operator control is one or more of rocker switches, toggle switches, rotary switches, pushbutton switches, key switches, or drum switches.

17. The mortar-dispensing device according to claim 15 wherein the operator control is a variable control such that the speed of extending and/or retracting is adjustable.

* * * * *